(12) United States Patent
Vanhoucke et al.

(10) Patent No.: US 9,460,711 B1
(45) Date of Patent: Oct. 4, 2016

(54) MULTILINGUAL, ACOUSTIC DEEP NEURAL NETWORKS

(71) Applicant: Google Inc., Mountain View, CA (US)

(72) Inventors: Vincent Olivier Vanhoucke, San Francisco, CA (US); Jeffrey Adgate Dean, Palo Alto, CA (US); Georg Heigold, Mountain View, CA (US); Marc'aurelio Ranzato, Mountain View, CA (US); Matthieu Devin, Los Altos Hills, CA (US); Patrick An Phu Nguyen, Palo Alto, CA (US); Andrew William Senior, New York, NY (US)

(73) Assignee: Google Inc., Mountain View, CA (US)

( * ) Notice: Subject to any disclaimer, the term of this patent is extended or adjusted under 35 U.S.C. 154(b) by 547 days.

(21) Appl. No.: 13/862,541

(22) Filed: Apr. 15, 2013

(51) Int. Cl.
  *G10L 15/00* (2013.01)
  *G10L 15/16* (2006.01)
  *G06F 17/28* (2006.01)
  *G10L 15/26* (2006.01)

(52) U.S. Cl.
  CPC ...................................... *G10L 15/16* (2013.01)

(58) Field of Classification Search
  USPC ........................................................ 704/1–10
  See application file for complete search history.

(56) References Cited

U.S. PATENT DOCUMENTS

| | | | |
|---|---|---|---|
| 8,527,276 B1* | 9/2013 | Senior et al. | 704/259 |
| 9,318,103 B2* | 4/2016 | Dines | G10L 15/02 |
| 2003/0149676 A1* | 8/2003 | Kasabov | 706/2 |
| 2009/0210218 A1* | 8/2009 | Collobert et al. | 704/9 |
| 2010/0057452 A1* | 3/2010 | Mukerjee et al. | 704/232 |
| 2012/0065976 A1 | 3/2012 | Deng et al. | |
| 2012/0072215 A1 | 3/2012 | Yu et al. | |
| 2012/0245919 A1* | 9/2012 | Aradilla et al. | 704/2 |
| 2014/0257805 A1* | 9/2014 | Huang | G10L 15/063 704/232 |

OTHER PUBLICATIONS

Swietojanski, "Unsupervised cross-lingual knowledge transfer in DNN-based LVCSR,", Dec. 2-5, 2012, In Spoken Language Technology Workshop (SLT), 2012 IEEE, vol., No., pp. 246-251.*

Kovac, "Multitask Learning for Bayesian Neural Networks", 2005, Thesis, University of Toronto, pp. i-91.*

Vesely et al, "The language-independent bottleneck features," Dec. 2-5, 2012, In Spoken Language Technology Workshop (SLT), 2012 IEEE, vol., No., pp. 336-341, Dec. 2-5, 2012.*

(Continued)

*Primary Examiner* — Olujimi Adesanya
(74) *Attorney, Agent, or Firm* — McDonnell Boehnen Hulbert & Berghoff LLP (57) ABSTRACT

Methods and systems for processing multilingual DNN acoustic models are described. An example method may include receiving training data that includes a respective training data set for each of two or more or languages. A multilingual deep neural network (DNN) acoustic model may be processed based on the training data. The multilingual DNN acoustic model may include a feedforward neural network having multiple layers of one or more nodes. Each node of a given layer may connect with a respective weight to each node of a subsequent layer, and the multiple layers of one or more nodes may include one or more shared hidden layers of nodes and a language-specific output layer of nodes corresponding to each of the two or more languages. Additionally, weights associated with the multiple layers of one or more nodes of the processed multilingual DNN acoustic model may be stored in a database.

16 Claims, 10 Drawing Sheets

(56) References Cited

OTHER PUBLICATIONS

Vinyals et al, "Comparing multilayer perceptron to Deep Belief Network Tandem features for robust ASR," In Acoustics, Speech and Signal Processing (ICASSP), 2011 IEEE International Conference on , vol., No., pp. 4596-4599.*
Deng, Three classes of deep learning architectures and their applications: a tutorial survey Dec. 3-6, 2012 in: APSIPA Transactions on Signal and Information Processing, 2012, pp. 1-28.*
Grezl et al "Study of probabilistic and Bottle-Neck features in multilingual environment," Dec. 2011, In Automatic Speech Recognition and Understanding (ASRU), 2011 IEEE Workshop on , vol., No., pp. 359-364.*
Scanzio et al. "On the Use of a Multilingual Neural Network Front-End",2008, In Interspeech 2008, Brisbane, Sep. 23-26, 2008, pp. 1-5.*
Langford et al, "Slow learners are fast," 2009, in NIPS, 2009, pp. 1-9.*
Thomas et al, "Multilingual MLP features for low-resource LVCSR systems," Mar. 2012, In IEEE International Conference on Acoustics, Speech and Signal Processing (ICASSP), Kyoto, 2012, pp. 4269-4272.*
Deng et al., "Recent advances in deep learning for speech research at Microsoft," May 2013, In IEEE International Conference on Acoustics, Speech and Signal Processing, Vancouver, BC, 2013, pp. 8604-8608.*
A. Mohamed, G. Hinton, and G. Penn, "Understanding How Deep Belief Networks Perform Acoustic Modeling", ICASSP 2012.
F. Seide, G. Li, and D. Yu, "Conversational speech transcription using context-dependent deep neural networks," in Interspeech, 2011.
G. Dahl, D. Yu, L. Deng, and A. Acero, "Context-dependent pre-trained deep neural networks for large vocabulary speech recognition," IEEE Transactions on Audio, Speech, and Language Processing, Special Issue on Deep Learning for Speech and Langauge Processing, vol. 20, No. 1, pp. 30-42, 2012.
G. Hinton, L. Deng, D. Yu, G. Dahl, A. Mohamed, N. Jaitly, A. Senior, V. Vanhoucke, P. Nguyen, T. Sainath, and B. Kingsbury, "Deep neural networks for acoustic modeling in speech recognition," IEEE Signal Processing Magazine, vol. 28, No. 6, 2012.
K. Kovác, "Multitask learning for Bayesian neural networks," M.S. thesis, University of Toronto, 2005.
S. Thrun, "Is learning the n-th thing any easier than learning the first?," in Advances in Neural Information Processing Systems (NIPS) 8, D. Touretzky and M. Mozer, Eds., Cambridge, MA, 1996, pp. 640-646, MIT Press.
J. Baxter, "A model of inductive bias learning," Journal of Artificial Intelligence Research, vol. 12, pp. 149-198, 2000.
R. Caruana, "Multitask learning," Machine Learning, vol. 28, pp. 41-75, 1997.
Q. Le, M. Ranzato, R. Monga, M. Devin, K. Chen, G. Corrado, J. Dean, and A. Ng, "Building high-level features using large scale unsupervised learning," in ICML, 2012.
J. Dean, G. Corrado, R. Monga, K. Chen, M. Devin, Q. Le, M. Mao, M. Ranzato, A. Senior, P. Tucker, K. Yang, and A. Ng, "Large scale distributed deep networks," in NIPS, 2012.
F. Diehl, Multilingual and Crosslingual Acoustic Modelling for Automatic Speech Recognition, Ph.D. thesis, Universitat Poli'ecnica de Catalunya, 2007.
J. Zheng and A. Stolcke, "fMPE-MAP: Improved discriminative adaptation for modeling new domains," in Interspeech, Antwerp, Belgium, Aug. 2007, pp. 1573-1576.
A. Stolcke, F. Grezl, M. Hwang, X. Lei, N. Morgan, and D. Vergyri, "Cross-domain and cross-language portability of acoustic features estimated by multilayer perceptrons," in ICASSP, Toulouse, France, 2006, pp. 321-324.
S. Thomas, S. Ganapathy, and H. Hermansky, "Cross-lingual and multi-stream posterior features for low-resource LVCSR systems," in Interspeech, Makuhari, Japan, Sep. 2010.
C. Plahl, R. Schlüter, and H. Ney, "Cross-lingual portability of Chinese and English neural network features for French and German LVCSR," in IEEE Automatic Speech Recognition and Understanding Workshop, Hawaii, USA, Dec. 2011, pp. 371-376.
Y. Qian and J. Liu, "Cross-lingual and ensemble MLPs strategies for low-resource speech recognition," in Interspeech, Portland, USA, Aug. 2012.
T. Schultz and A. Waibel, "Multilingual and crosslingual speech recognition," in Proc. DARPA Workshop on Broadcast News Transcription and Understanding, 1998, pp. 259-262.
N. T. Vu, W. Breiter, F. Metze, and T. Schultz, "An investigation on initialization schemes for multilayer perceptron training using multilingual data and their effect on ASR performance," in Interspeech, Portland, USA, Aug. 2012.
H. Lin, L. Deng, D. Yu, Y. Gong, A. Acero, and C.-H. Lee, "A study on multilingual acoustic modeling for large vocabulary ASR," in ICASSP, Apr. 2009.
L. Burget, P. Schwarz, M. Agarwal, P. Akyazi, F. Kai, A. Ghoshal, O. Glembek, N. Goel, M. Karafi'at, D. Povey, A. Rastrow, R.C. Rose, and S. Thomas, "Multilingual acoustic modeling for speech recognition based on subspace Gaussian mixture models," in ICASSP, 2010, pp. 4334-4337.
H. Bourlard, J. Dines, M. Magimai-Doss, P. Garner, D. Imseng, P. Motlicek, H. Liang, L. Saheer, and F. Valente, "Current trends in multilingual speech processing," Sadhana, vol. 36, No. 5, pp. 885-915, Oct. 2011.
D. Cires,an, U. Meier, and J. Schmidhuber, "Transfer learning for Latin and Chinese characters with deep neural networks," in IJCNN, 2012.
G. Hinton, S. Osindero, and Y.-W. Teh, "A fast learning algorithm for deep belief nets," Neural Computation, vol. 18, No. 7, pp. 1527-1554, 2006.
L. Bottou, "Stochastic gradient learning in neural networks," in Neuro-Nîmes, 1991.
J.C. Duchi, E. Hazan, and Y. Singer, "Adaptive subgradient methods for online learning and stochastic optimization," Journal of Machine Learning Research, vol. 12, pp. 2121-2159, 2011.
N. Jaitly, P. Nguyen, A. Senior, and V. Vanhoucke, "Application of pretrained deep neural networks to large vocabulary speech recognition," in Interspeech, Sep. 2012.

* cited by examiner

MULTILINGUAL, ACOUSTIC DEEP NEURAL NETWORKS

BACKGROUND

Speech recognition involves translating spoken words into text. As a result of advancements in speech recognition over the last decade, speech recognition is now used in a growing number of applications and services. For example, voice-enabled search systems utilize speech recognition to allow a user to search the Internet or control functions of an automobile using a voice command.

One approach for performing computerized speech recognition involves using an acoustic model to model the relationship between an acoustic feature vector and a phoneme, a basic unit of a language's phonology. Acoustic feature vectors are numerical representations of acoustic speech that are determined by sampling and filtering speech data. For each feature vector, an acoustic model may output a statistical representation (e.g., a joint probability distribution) indicating a likelihood that the feature vector corresponds to a particular phoneme. From the likelihoods output by the acoustic model, a decoder may then be used to classify observed sequences of phonemes as one or more words.

Multiple types of acoustic models for speech recognition exist. In many examples, Hidden Markov Models (HMMs) are used to model the sequential structure of speech signals. For instance, each HMM state may use a Gaussian mixture model (GMM) to determine how well each state of each HMM fits a feature vector or sequence of feature vectors. An alternative way to evaluate the fit is to use a feedforward neural network that receives a sequence of feature vectors as input and derives posterior probabilities over HMM states as output.

Traditionally, languages and dialects within languages are considered independently. For each language (and each dialect), a separate acoustic model is trained from scratch. The language-specific acoustic model is then utilized to recognize speech that is spoken in that particular language.

SUMMARY

Example systems and methods for multilingual training of acoustic models are described herein. According to some example systems and methods, rather than training monolingual acoustic models for each language from scratch, a larger and more accurate multilingual acoustic model may be jointly trained based on training data from multiple languages. In one example method, a multilingual acoustic model that is based on a deep neural network (DNN) is jointly trained on data from different languages. The multilingual acoustic model can include a shared feature extraction and language-specific classifiers. In some examples, the systems and methods described herein allow for parameter sharing across languages, which may be helpful in particular for resource-scarce languages where limited training data is available or is costly to obtain.

In one example aspect, a method is provided that involves receiving training data that includes a respective training data set for each of two or more or languages. The method may also include processing a multilingual deep neural network (DNN) acoustic model based on the training data to generate a trained multilingual DNN acoustic model. The multilingual DNN acoustic model may include a feedforward neural network having multiple layers of one or more nodes. Each node of a given layer may connect with a respective weight to each node of a subsequent layer. Further, the multiple layers of one or more nodes may include one or more hidden layers of nodes that are shared between at least two of the two or more languages and a language-specific output layer of nodes corresponding to each of the two or more languages. Additionally, the method may further include storing weights associated with the multiple layers of one or more nodes of the processed multilingual DNN acoustic model in a database.

In another example aspect, a computer-readable medium having stored thereon instructions that, when executed by a computing device, cause the computing device to perform functions is provided. The functions may include receiving training data that includes a respective training data set for each of two or more or languages. The functions may also include processing a multilingual deep neural network (DNN) acoustic model based on the training data to generate a trained multilingual DNN acoustic model. The multilingual DNN acoustic model may include a feedforward neural network having multiple layers of one or more nodes. Each node of a given layer may connect with a respective weight to each node of a subsequent layer. Further, the multiple layers of one or more nodes may include one or more hidden layers of nodes that are shared between at least two of the two or more languages and a language-specific output layer of nodes corresponding to each of the two or more languages. Additionally, the functions may further include storing weights associated with the multiple layers of one or more nodes of the processed multilingual DNN acoustic model in a database.

In another example aspect, a computing device that includes a processor and a computer-readable medium is provided. The computer-readable medium may be configured to store instructions, that when executed by the processor, cause the computing device to perform functions. The functions may include receiving training data that includes a respective training data set for each of two or more or languages. The functions may also include processing a multilingual deep neural network (DNN) acoustic model based on the training data to generate a trained multilingual DNN acoustic model. The multilingual DNN acoustic model may include a feedforward neural network having multiple layers of one or more nodes. Each node of a given layer may connect with a respective weight to each node of a subsequent layer. Further, the multiple layers of one or more nodes may include one or more hidden layers of nodes that are shared between at least two of the two or more languages and a language-specific output layer of nodes corresponding to each of the two or more languages. Additionally, the functions may further include storing weights associated with the multiple layers of one or more nodes of the processed multilingual DNN acoustic model in a database.

In another example, a system is provided that includes a means for receiving training data that includes a respective training data set for each of two or more or languages. The system may also include a means for processing a multilingual deep neural network (DNN) acoustic model based on the training data to generate a trained multilingual DNN acoustic model. The multilingual DNN acoustic model may include a feedforward neural network having multiple layers of one or more nodes. Each node of a given layer may connect with a respective weight to each node of a subsequent layer. Further, the multiple layers of one or more nodes may include one or more hidden layers of nodes that are shared between at least two of the two or more languages and a language-specific output layer of nodes corresponding to each of the two or more languages. Additionally, the system may further include a means for storing weights associated with the multiple layers of one or more nodes of the processed multilingual DNN acoustic model in a database.

The foregoing summary is illustrative only and is not intended to be in any way limiting. In addition to the illustrative aspects, embodiments, and features described above, further aspects, embodiments, and features will become apparent by reference to the figures and the following detailed description.

DETAILED DESCRIPTION

In the following detailed description, reference is made to the accompanying figures, which form a part hereof. In the figures, similar symbols typically identify similar components, unless context dictates otherwise. The illustrative embodiments described in the detailed description, figures, and claims are not meant to be limiting. Other embodiments may be utilized, and other changes may be made, without departing from the scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

This disclosure may disclose, inter alia, methods and systems for processing multilingual acoustic models that are based on DNNs. According to the systems and methods, rather than training monolingual acoustic models for each language from scratch, a larger and more accurate multilingual acoustic model may be jointly trained based on data from multiple languages. In one example method, a multilingual DNN acoustic model is processed based on training data that includes individual training data sets for each of two or more languages. The multilingual DNN acoustic model may include one or more hidden layers of nodes that are shared between multiple languages and a language-specific output layer of nodes corresponding to each of the multiple languages. Processing the multilingual DNN acoustic model may involve determining weights of the DNN by jointly training the multilingual DNN acoustic model on the individual training data sets. Weights of the multilingual DNN acoustic model that are determined based on the processing may then be stored in a database. The multilingual DNN acoustic model and stored weights may subsequently be accessed for use within a speech recognition system, for example.

In an example embodiment, the method may be applicable to automatic speech recognition (ASR) systems. For instance, a trained multilingual DNN acoustic model may be used to perform ASR in a multilingual or monolingual setting.

In contrast to monolingual architectures where acoustic models for each language are separately trained, the multilingual training systems and methods described herein allow for resource sharing. For instance, training one multilingual DNN acoustic model may require less processing power and computation than training multiple monolingual acoustic models for each language. Additionally, for a resource-scarce language, where training data may be limited or costly to obtain, a multilingual acoustic model may offer improved model accuracy over monolingual acoustic models for the resource-scarce language. For example, using a multilingual acoustic model that is trained on data from the resource-scarce language as well as data from one or more other languages may yield more accurate results when performing ASR for the resource-scarce language than using a monolingual acoustic model that is trained using only data from the resource-scarce language.

Additional functionalities and examples of the described methods and systems are also described hereinafter with reference to the accompanying figures.

Figure 1:
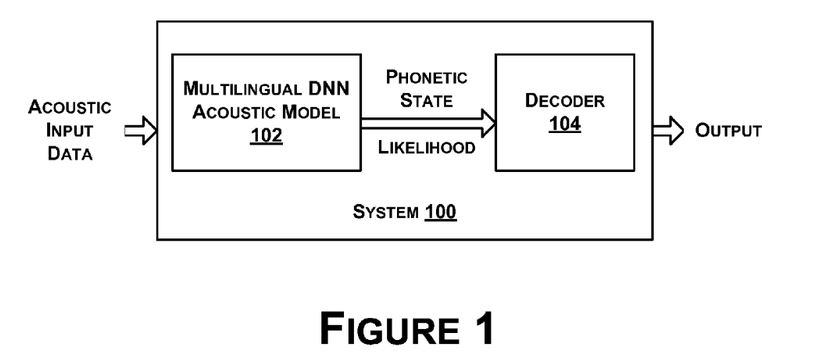
FIG. 1 illustrates an example system.

Referring now to the figures, FIG. 1 illustrates an example system 100. The system 100 may include a multilingual DNN acoustic model 102 and a decoder 104. In one example, the system 100 may be an ASR system. For instance, the ASR system may be configured for execution in a mobile device or other type of computing device. Note that the example system 100 is provided for purposes of example and explanation. Other example configurations may also exist, and the example is not meant to be limiting in any manner.

As shown in FIG. 1, the system 100 may be configured to receive acoustic input data and determine an output. In one instance, the acoustic input data may be a feature vector or sequence of feature vectors that are extracted from a speech signal. A sequence of feature vectors may be determined by sampling and filtering a portion of a speech signal to determine a spectral representation of the data. As one example, feature vectors may be determined by processing a spoken utterance using digital signal processing to determine a set of mel-frequency cepstral coefficients (MFCCs). As another example, the feature vectors may be log filter-banks.

The received acoustic input data may then be provided as input to the multilingual DNN acoustic model 102. The multilingual DNN acoustic model 102 may be configured to output probabilities with respect to phonetic states corresponding to the acoustic input data. Speech can be broken into phonetic segments, referred to as phones, or further broken into sub-phonetic segments referred to as senones. The multilingual DNN acoustic model 102 may be configured to output, for each of multiple possible phonetic or sub-phonetic states, the probability that the received acoustic input data corresponds to the phonetic or sub-phonetic state. For example, the multilingual DNN acoustic model 102 may be configured to output probabilities associated with phonetic states of a HMM. Training the multilingual DNN acoustic model 102 may involve mapping the multilingual DNN acoustic model 102 to acoustic examples obtained from training data as will be further described below.

The decoder 104 may be configured to search a space of possible words of a given language to match one or more phonetic states to words based on the probabilities output by the multilingual DNN acoustic model 102. In some instances, the system 100 may further include a language model (not shown) that also models syntactical and/or grammatical constraints of the spoken language in order to determine one or more words. Thus, the output determined by the system 100 may be an indication of a word or phrase that corresponds to the received acoustic input data.

Figure 2:
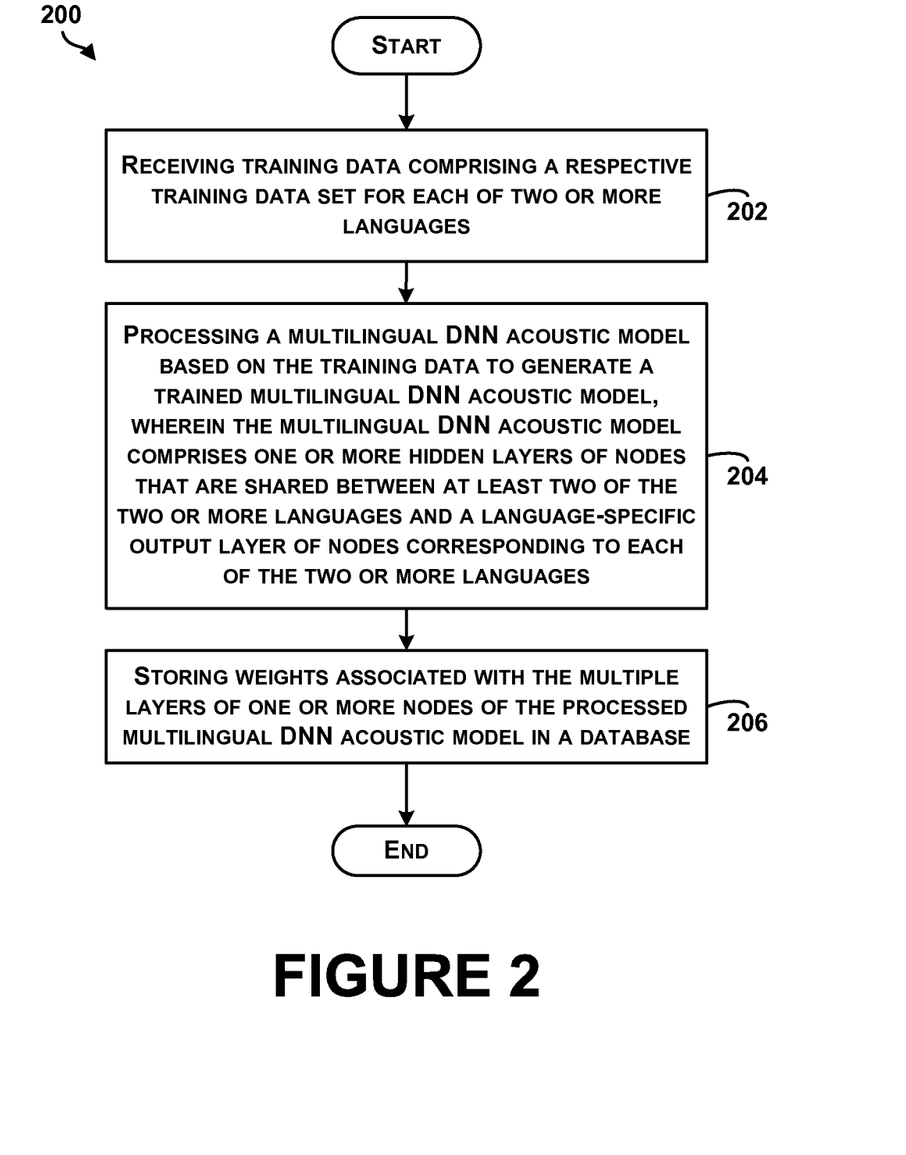
FIG. 2 is a block diagram of an example method for processing an acoustic model.

FIG. 2 is a block diagram of an example method 200 for processing an acoustic model. Method 200 shown in FIG. 2 presents an embodiment of a method that could be used or implemented by the computing device 900 of FIG. 9, for example, or by components of the computing device 900 of FIG. 9, or more generally by any computing device. In one instance, the method 200 may be used to train the multilingual DNN acoustic model 102 of FIG. 1. Method 200 may include one or more operations, functions, or actions as illustrated by one or more of blocks 202-206. Although the blocks are illustrated in a sequential order, these blocks may also be performed in parallel, and/or in a different order than those described herein. Also, the various blocks may be combined into fewer blocks, divided into additional blocks, and/or removed based upon the desired implementation.

In addition, for the method 200 and other processes and methods disclosed herein, the block diagram shows functionality and operation of one possible implementation of present embodiments. In this regard, each block may represent a module, a segment, or a portion of program code, which includes one or more instructions executable by a processor or computing device for implementing specific logical functions or steps in the process. The program code may be stored on any type of computer-readable medium, for example, such as a storage device including a disk or hard drive. The computer-readable medium may include non-transitory computer-readable medium, for example, such as computer-readable media that stores data for short periods of time like register memory, processor cache and random access memory (RAM). The computer-readable medium may also include non-transitory media, such as secondary or persistent long term storage, like read only memory (ROM), optical or magnetic disks, compact-disc read only memory (CD-ROM), for example. The computer-readable media may also be any other volatile or non-volatile storage systems. The computer-readable medium may be considered a computer-readable storage medium, for example, or a tangible storage device.

In addition, for the method 200 and other processes and methods disclosed herein, each block in FIG. 2 may represent circuitry that is wired to perform the specific logical functions in the process.

Initially, at block 202, the method 200 includes receiving training data comprising a respective training data set for each of two or more languages. A training data set for an individual language may include one or any combination of read/spontaneous speech and supervised/unsupervised data received from any number of sources. For instance, the training data may be data recorded from voice searches, audio clips, videos, or other sources that has been transcribed. More specifically, the training data may be feature-extracted windows of speech that are associated with a label. For example, the training data may include portions of audio data that are labeled as phonetic states or sub-phonetic states. Additionally, the amount of training data (e.g., number of hours of speech) for each of the two or more languages may vary. In some examples, a database may store multiple types of training data sets, and a processor may access the database to receive a given training data set.

At block 204, the method 200 includes processing a multilingual DNN acoustic model based on the training data to generate a trained multilingual DNN acoustic model. The multilingual DNN acoustic model may be a multilingual acoustic model that is based on a DNN. A deep neural network is feedforward neural network that has more than one layer of hidden nodes between its input and its output. Within a feedforward neural network, information moves forward, from input nodes of an input layer, through one or more hidden layers of nodes, to output nodes of an output layer. Each node in a given layer may be a computational unit that determines a value and outputs the value to each node of a subsequent layer. The output value may also be weighted based on a respective weight between the node and a specific node of the subsequent layer.

In one example, the multilingual DNN acoustic model may include one or more hidden layers of nodes that are shared between at least two of the two or more languages and a language-specific output layer of nodes corresponding to each of the two or more languages. In one instance, each node of the one or more hidden layers may be shared between each of the two or more languages. Alternatively, the one or more hidden layers of nodes may be organized in a tree-like structure such that each node of the one or more hidden layers of nodes need not be shared between each of the two or more languages. For instance, a first group of nodes of a given hidden layer may be shared between a first pair of languages while a second group of nodes of the given layer may be shared between a second pair of languages. In one scenario, the first group may include a first language and a second language while the second group may include the second language and a third language. In another scenario, the first group may include a first language and a second language while the second group may include a third language and a fourth language. Further explanation of an example multilingual DNN is described with reference to FIGS. 3A, 3B and 4.

Figure 3A:
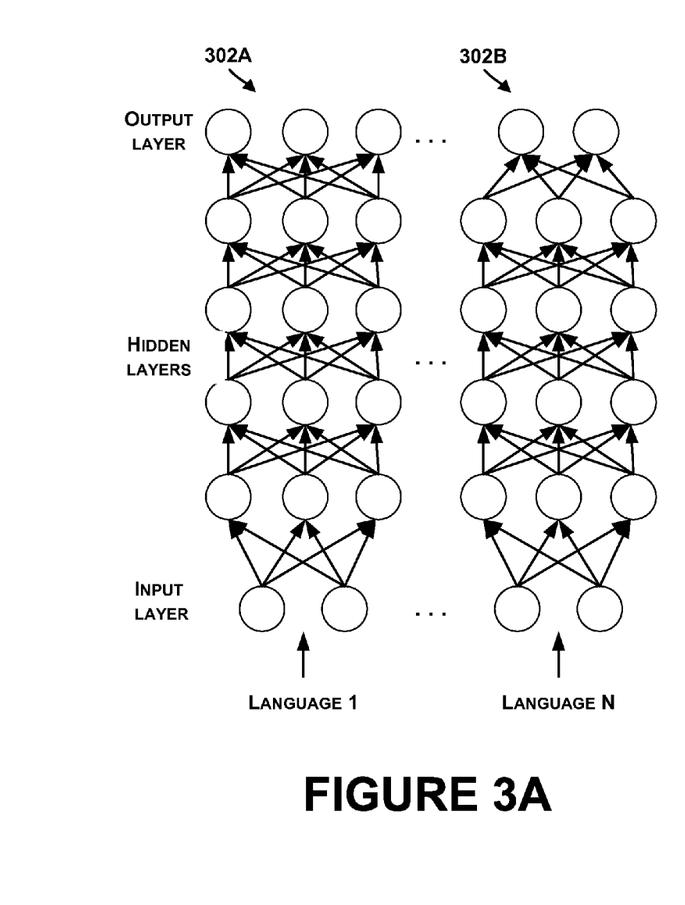
FIGS. 3A and 3B are conceptual illustrations of example neural networks.

FIGS. 3A and 3B are conceptual illustrations of example neural networks. Before describing a multilingual DNN, for purposes of comparison, a brief overview of a monolingual DNN is provided. As shown in FIG. 3A, in a monolingual setting, for each of multiple languages 1, 2, . . . N, a corresponding monolingual DNN is provided. For example, monolingual DNN 302A corresponds to a first language and monolingual DNN 302B corresponds to an Nth language.

Each of the monolingual DNNs 302A and 302B include an input layer, one or more hidden layers, and an output layer. Each layer further includes one or more nodes. Nodes of a given layer connect to each node of a subsequent layer via directed connections. When audio input data for a given language is received at an input layer, each node of the monolingual DNNs 302A and 302B may perform a computation and output a result to each node of a first hidden layer. Outputs may then be determined by each node of the first hidden layer and provided as input to nodes of a second hidden layer. The process may subsequently be repeated, layer by layer, until nodes of the output layer finally output values corresponding to the received audio input data for the given language.

To perform speech recognition for the first language, an acoustic model that is trained based on the monolingual DNN 302A may be used, while to perform speech recognition for the Nth language, the monolingual DNN 302B may be used. In a multilingual architecture, a single multilingual DNN may be used to perform speech recognition for any of the languages 1, 2, . . . N.

Figure 3B:
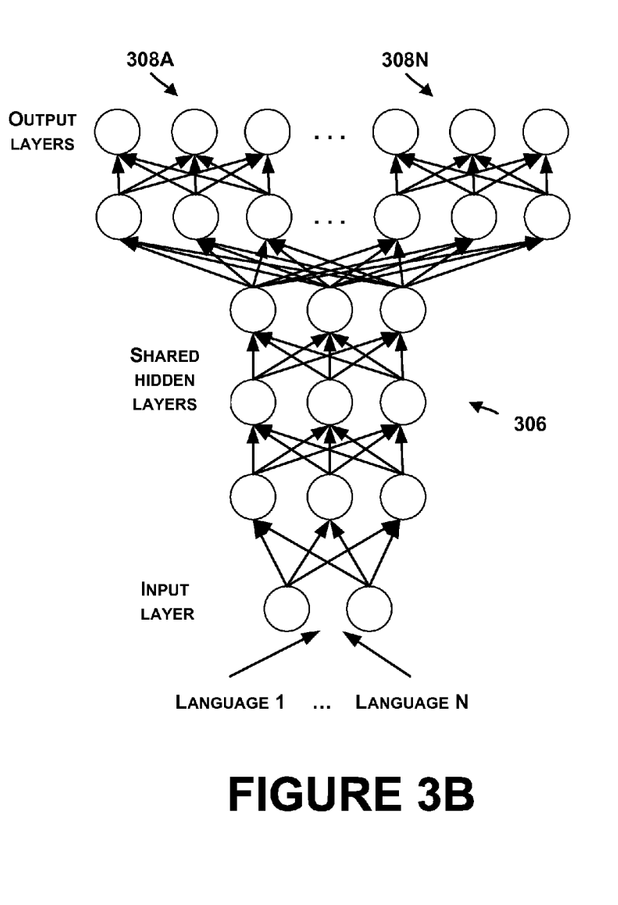

FIG. 3B shows an example of a multilingual DNN 306. The multilingual DNN 306 may include multiple hidden layers of one or more nodes that are shared between languages 1, 2, . . . N and language-specific output layers of nodes 308A to 308N corresponding to each of the languages 1, 2, . . . N. Note that although the nodes of the shared hidden layers of the multilingual DNN 306 are indicated as being shared between each of the languages 1, 2 . . . N, this example is not meant to be limiting. As described above, the nodes of the multiple hidden layers of nodes may be shared between two languages or more than two languages.

In one example, when audio input data of a first language is received, the language-specific output layer of nodes 308A may output values corresponding to the received audio input data. Similarly, when audio input data of an Nth language is received, the language-specific output layer of nodes 308N may output values corresponding to the received audio input data. The language-specific output layers of nodes 308A to 308N may correspond to language dependent phonetic events that are present for each of the different languages 1,2, . . . N.

The multilingual DNN 306 is a simplified example. In another example, a multilingual DNN may include 4 hidden layers, each with 2056 nodes. The number of nodes of each language-specific output layer may vary based on the number of senones for each language. Thus, the multilingual DNN acoustic model that is processed at block 204 may include one or more hidden layers of nodes that are shared between at least two of the two or more languages and a language-specific output layer of nodes corresponding to each of the two or more languages.

Figure 4:
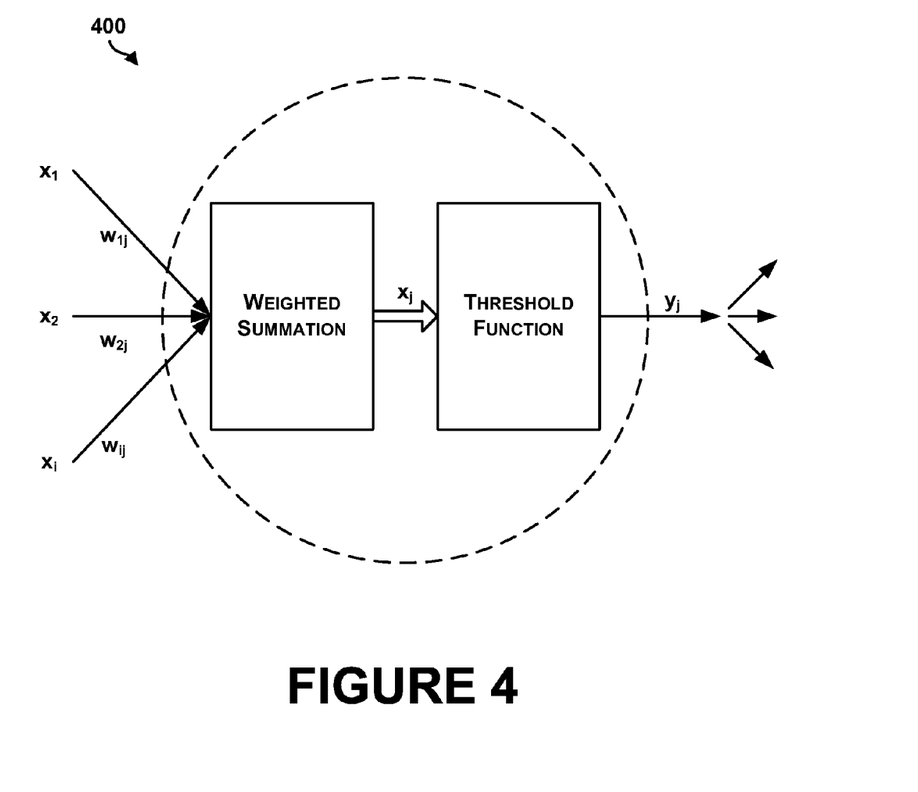
FIG. 4 is a conceptual illustration of an example node.

FIG. 4 is a conceptual illustration of an example node 400. The example node 400 may represent a node of any of the hidden layers of the multilingual DNN 306, for instance. As described briefly above, each node 400 may be configured to receive one or more inputs from other nodes of a layer below the node. As shown in FIG. 4, the node 400 may receive i inputs $x_1, x_2, \ldots x_i$. Each of the inputs may be a numerical value that is weighted by a corresponding weight w. Based on the received inputs, the node 400 may determine a total input $x_j$ from the layer below. The weighted sum may subsequently be normalized using a threshold function to determine a scalar state $y_j$ that the node outputs to the layer above. Finally, for each node of a subsequent layer, the scalar state may be weighted by a respective weight associated with a connection to the node and provided as input to the node.

In one instance, for a node that is a member of a hidden layer, the threshold function may be a logistic function. For example, based on a total input $x_j$ from the layer below, a scalar state $y_j$ may be determined using the equation:

$$y_j = \text{logistic}(x_j) = \frac{1}{1+e^{-x_j}}.$$

In another instance, for a node that is a member of an output layer, the threshold function may be a softmax function that determines an output probability $p_j$ using the equation:

$$p_j = \frac{\exp(x_j)}{\sum_k \exp(x_k)},$$

where k is an index over all possible output classes (e.g., all possible phonetic states).

In one example, processing the multilingual DNN acoustic model may include jointly training the multilingual DNN acoustic model based on the training data. For example, the multilingual DNN acoustic model may be processed on the training data by backpropagating derivatives of a cost function that measures the discrepancy between an expected output d and actual output produced by the multilingual DNN acoustic model for each training data case. An example cost function C may be of the form:

$$C = -\Sigma_j d_j \log p_j.$$

Other example threshold functions, such as the hyperbolic tangent, or generally any function with a well-behaved derivate, may also be used. Similarly, other cost functions may be used for determining errors that are used in backpropagation. Thus, the example threshold functions and cost functions are not meant to be limiting. A specific implementation of backpropagation for a large DNN is also described further below with reference to FIGS. 5 and 6.

Returning to the method 200, at block 206, the method 200 includes storing weights associated with the multiple layers of one or more nodes of the processed multilingual DNN acoustic model in a database. For example, the weights may be stored in association with each node of the multilingual DNN acoustic model so that the multilingual DNN acoustic model may be used in an ASR system.

In one instance, the processing of the multilingual DNN acoustic model at block 204 may involve performing a stochastic gradient descent (SGD) algorithm. SGD is a type of backpropagation algorithm for training DNNs. SGD is inherently sequential and may therefore be problematic for large DNNs and large sets of training data. To overcome the problem, a distributed software framework which allows distributed computation on multiple CPUs while processing a multilingual DNN may be used.

Figure 5:
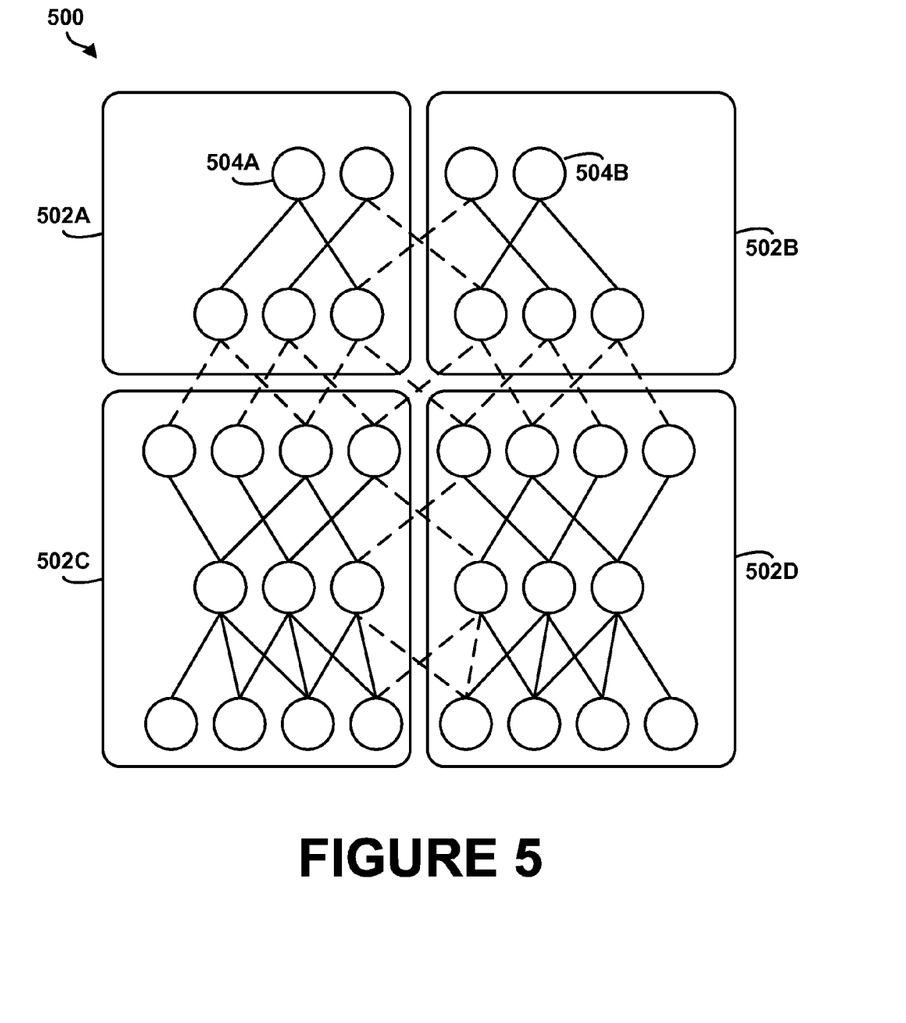
FIG. 5 is a conceptual illustration of an example distributed framework.

FIG. 5 is a conceptual illustration 500 of an example distributed framework. In one instance, computations performed for each node of a DNN may be distributed across several computing machines 502A-D so that responsibility for computation for different nodes is assigned to different computing machines. For instance, computation for node 504A may be performed by machine 502A while computation for node 504B may be performed by machine 502B. For connections between nodes that cross partition boundaries, values computed at the nodes may be transmitted between the computing machines 502A-D.

Figure 6:
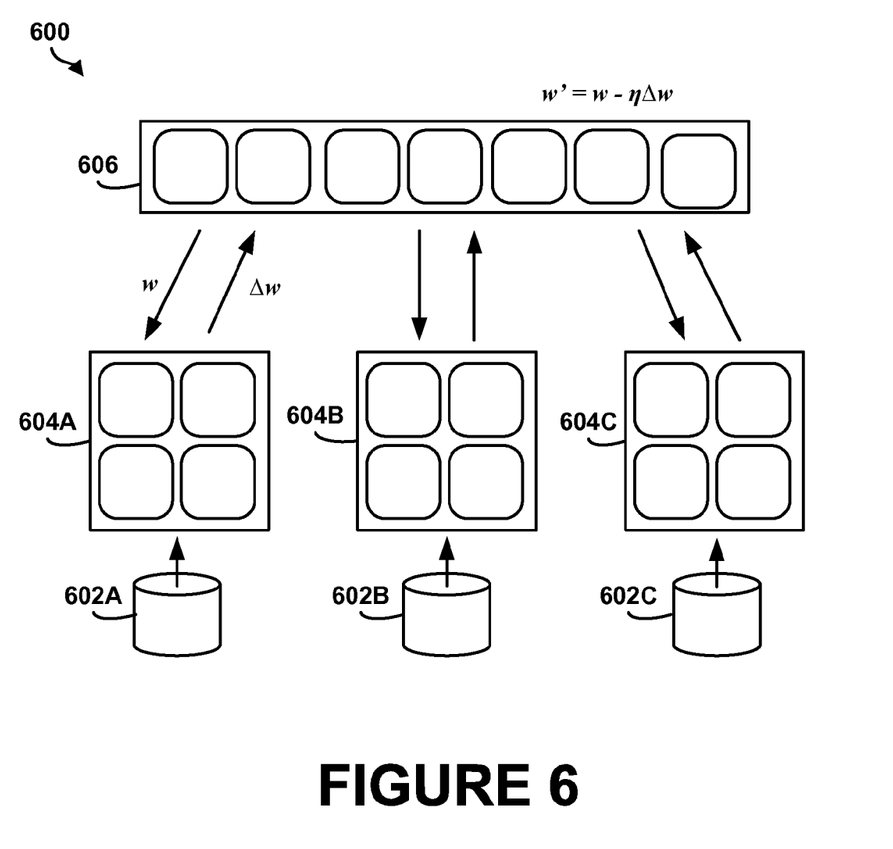
FIG. 6 is a conceptual illustration of example distributed processing of multiple model instances of an acoustic model.

In some examples, to further decrease processing time, computation may be distributed across multiple model instances of a DNN. FIG. 6 is a conceptual illustration 600 of distributed processing of multiple model instances of an acoustic model. In one example, to apply SGD based on training data, the training data may be divided into a number of subsets of training data 602A-C. Each subset of training data 602A-C may then be processed on a respective model instance, or copy, of a DNN model. For example, a first model instance 604A may be processed based on the subset of training data 602A, a second model instance 604B may be processed based on the subset of training data 602B, and a third model instance 604C may be processed based on the subset of training data 602C.

Parameters such as weights and errors from each model instance 604A-C may be communicated to and updated by a centralized parameter server 606. In one example, before processing a batch of training data, each model instance may query the centralized parameter server 606 for an updated copy of model parameters. After receiving the updated copy of model parameters, a parameter gradient may be computed and updated to the centralized parameter server 606, which applies the gradient to model parameters stored by the centralized parameter server 606. In some instances, an adaptive learning rate procedure may also be used for each parameter.

Figure 7:
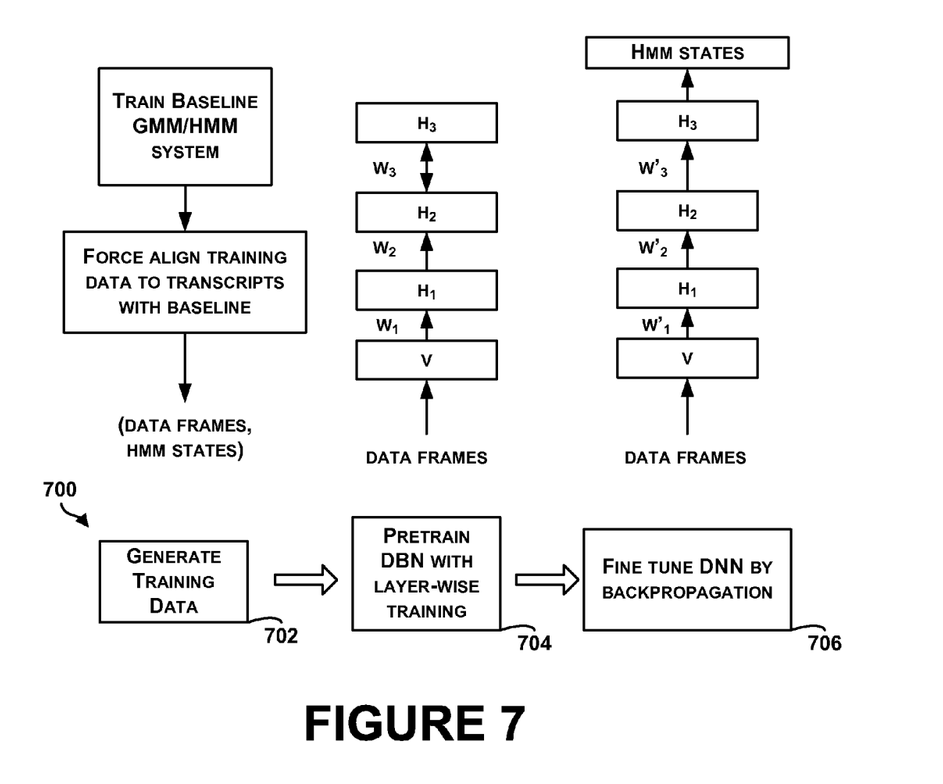
FIG. 7 is a block diagram of another example method for processing an acoustic model.

FIG. 7 is a block diagram of another example method 700 for processing an acoustic model. In some examples, the method 700 may be combined with the method 200. For instance, one or more of the blocks 702-706 of method 700 may be combined with the method 200. Example method 700 describes a three-stage training procedure that may be used for fitting a multilingual DNN acoustic model with training data.

In a first stage, at block 702, training data for a multilingual DNN acoustic model may be generated. For instance, a baseline Gaussian Markov model/hidden Markov model (GMM/HMM) system may receive acoustic data frames and determine corresponding output HMM states. As a result, each frame of training data may be assigned an HMM state.

In a second stage, at block 704, a deep belief network (DBN) may be trained on the acoustic data frames. DBNs are probabilistic generative models that are composed of multiple layers of stochastic, latent variables. The DBN may be processed one layer at a time by treating the values of the latent variables in one layer, when they are being inferred from data, as the data for training the next layer. For instance, the DBN may be processed layer by layer using a model known as a Restricted Boltzmann Machine (RBM) at each layer. In one example, contiguous data frames of acoustic vectors may be modeled with the DBN. After weights of the deep belief network have been learned layer-by-layer, the weights of the deep belief network may be used to initialize weights of a multilingual DNN acoustic model.

In a third stage, at block 706, the multilingual DNN acoustic model may be trained on the training data, using backpropagation for example. As a result, weights of the multilingual DNN acoustic model that correctly predict the target HMM states, which were obtained using the baseline GMM/HMM system, may be determined. Therefore, in some examples, weights of a multilingual DNN acoustic model may be initialized based on weights of a pretrained DBN.

Figure 8:
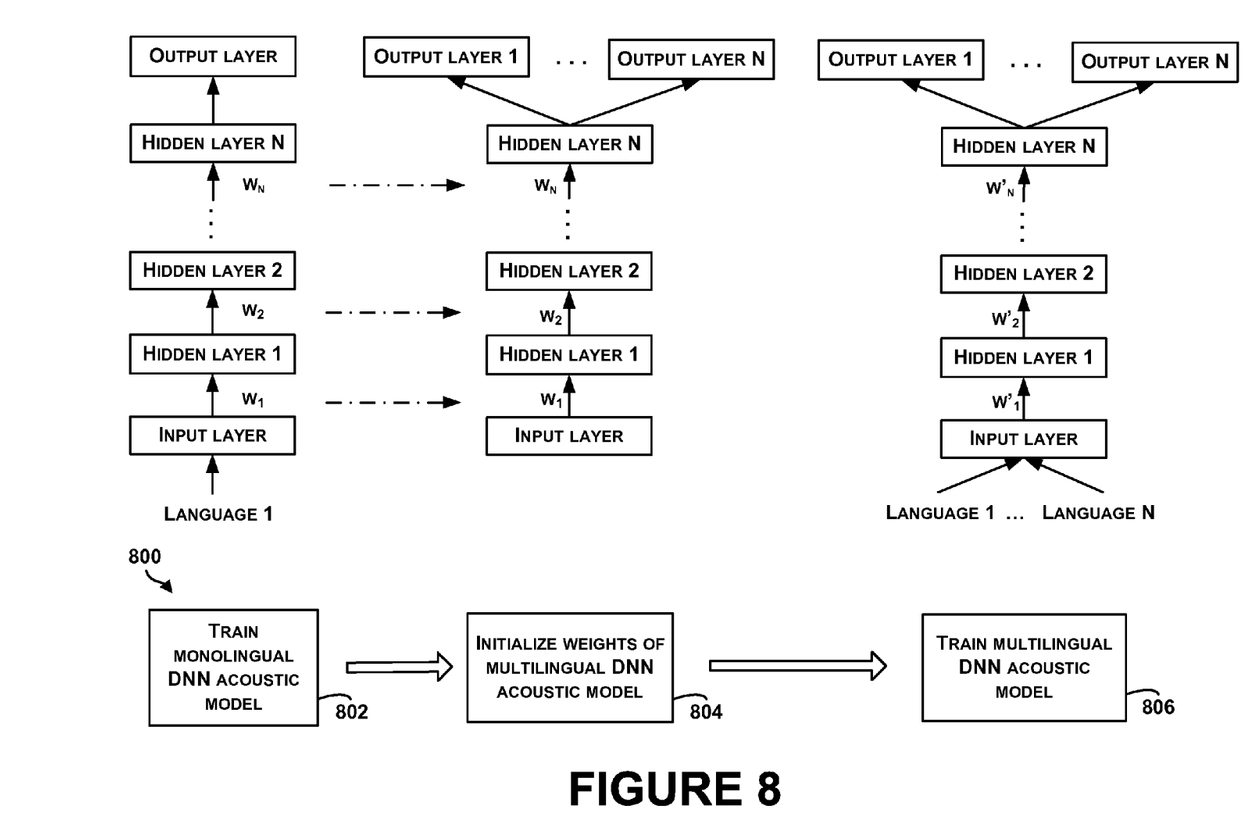
FIG. 8 is a block diagram of still another example method for processing an acoustic model.

Carefully initializing weights of a multilingual DNN acoustic model may also be used to reduce training time for processing the multilingual DNN acoustic model. FIG. 8 is a block diagram of still another example method 800 for processing an acoustic model. In some examples, the method 800 may be combined with the method 200. For instance, one or more of the blocks 802-806 of method 800 may be combined with the method 200.

Initially, at block 802, the method 800 includes training a monolingual DNN acoustic model. For example, the monolingual DNN acoustic model may be processed on training data of a first language using backpropagation. In other examples, the monolingual DNN acoustic model may be subsequently processed on training data for a second language using feature learning. For instance, feature learning may use the weights of one or more bottom hidden layers, which have been processed on training data of a first language, to learn weights of one or more classifier layers (e.g., an output layer and one or more hidden layers). During processing of the training data for the second language, the weights of the one or more bottom hidden layers may be held fixed.

At block 804, the method 800 includes initializing weights of a multilingual DNN acoustic model based on the trained monolingual DNN acoustic model. In one example, one or more weights of the hidden layers of the monolingual DNN acoustic model may be used as initial weights of corresponding hidden layers of the multilingual DNN acoustic model. In a further example, one or more weights of an output layer that were determined using feature learning may be used to initialize weights of a language-specific output layer. Any of the weights of the multilingual DNN acoustic model that are not initialized based on weights of the monolingual acoustic model may be initialized with random weights.

At block 806 the method 800 includes training the multilingual DNN acoustic model. For instance, the multilingual DNN acoustic model may be processed based on training data that includes respective training data sets for each of two or more languages.

Figure 9:
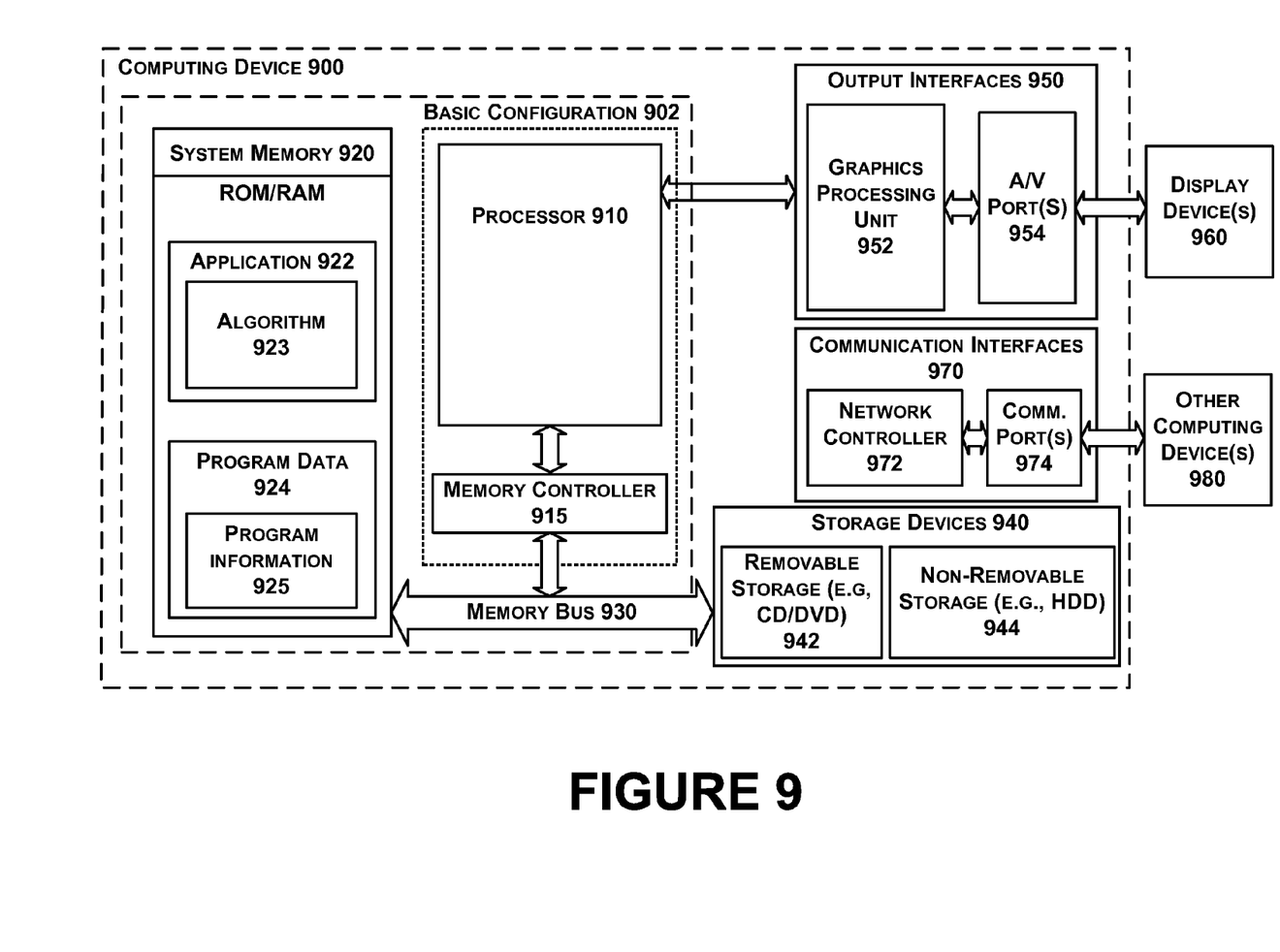
FIG. 9 is a functional block diagram illustrating an example computing device used in a computing system that is arranged in accordance with at least some embodiments described herein.

FIG. 9 is a functional block diagram illustrating an example computing device 900 used in a computing system that is arranged in accordance with at least some embodiments described herein. The computing device 900 may be implemented to process a multilingual DNN acoustic model or perform any of the functions described above with reference to FIGS. 1-8. In a basic configuration 902, computing device 900 may typically include one or more processors 910 and system memory 920. A memory bus 930 can be used for communicating between the processor 910 and the system memory 920. Depending on the desired configuration, processor 910 can be of any type including but not limited to a microprocessor (µP), a microcontroller (µC), a digital signal processor (DSP), or any combination thereof. A memory controller 915 can also be used with the processor 910, or in some implementations, the memory controller 915 can be an internal part of the processor 910.

Depending on the desired configuration, the system memory 920 can be of any type including but not limited to volatile memory (such as RAM), non-volatile memory (such as ROM, flash memory, etc.) or any combination thereof. System memory 920 may include one or more applications 922, and program data 924. Application 922 may include an algorithm 923 that is arranged to provide inputs to the electronic circuits, in accordance with the present disclosure. Program data 924 may include program information 925 that could be directed to any number of types of data. For instance, application 920 may execute an algorithm that is configured to process a multilingual DNN acoustic model. In some example embodiments, application 922 can be arranged to operate with program data 924 on an operating system.

Computing device 900 can have additional features or functionality, and additional interfaces to facilitate communications between the basic configuration 902 and any devices and interfaces. For example, data storage devices 940 can be provided including removable storage devices 942, non-removable storage devices 944, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Computer storage media can include volatile and nonvolatile, non-transitory, removable and non-removable media implemented in any method or technology for storage of information, such as computer-readable instructions, data structures, program modules, or other data.

System memory 920 and storage devices 940 are examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 900. Any such computer storage media can be part of device 900.

Computing device 900 can also include output interfaces 950 that may include a graphics processing unit 952, which can be configured to communicate to various external devices such as display devices 960 or speakers via one or more A/V ports 954 or a communication interface 970. The communication interface 970 may include a network controller 972, which can be arranged to facilitate communications with one or more other computing devices 980 over a network communication via one or more communication ports 974. The communication connection is one example of a communication media. Communication media may be embodied by computer-readable instructions, data structures, program modules, or other data in a modulated data signal, such as a carrier wave or other transport mechanism, and includes any information delivery media. A modulated data signal can be a signal that has one or more of its characteristics set or changed in such a manner as to encode information in the signal. By way of example, and not limitation, communication media can include wired media such as a wired network or direct-wired connection, and wireless media such as acoustic, radio frequency (RF), infrared (IR) and other wireless media.

Computing device 900 can be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. Computing device 900 can also be implemented as a personal computer, including both laptop computer and non-laptop computer configurations, or a server.

Figure 10:
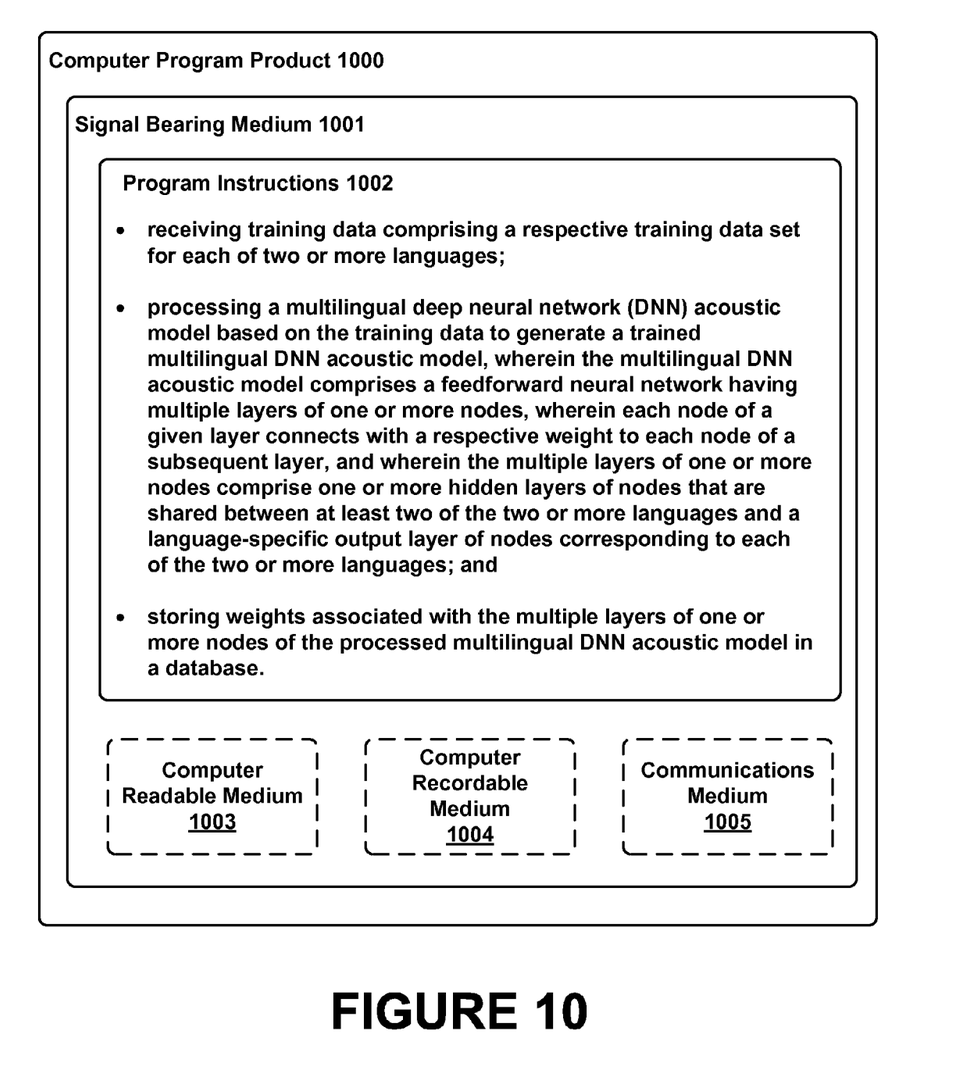
FIG. 10 is a schematic illustrating a conceptual partial view of an example computer program product that includes a computer program for executing a computer process on a computing device, arranged according to at least some embodiments presented herein.

In some embodiments, the disclosed methods may be implemented as computer program instructions encoded on a non-transitory computer-readable storage media in a machine-readable format, or on other non-transitory media or articles of manufacture. FIG. 10 is a schematic illustrating a conceptual partial view of an example computer program product 1000 that includes a computer program for executing a computer process on a computing device, arranged according to at least some embodiments presented herein.

In one embodiment, the example computer program product 1000 is provided using a signal bearing medium 1001. The signal bearing medium 1001 may include one or more programming instructions 1002 that, when executed by one or more processors may provide functionality or portions of the functionality described above with respect to FIGS. 1-9. In some examples, the signal bearing medium 1001 may encompass a computer-readable medium 1003, such as, but not limited to, a hard disk drive, a Compact Disc (CD), a Digital Video Disk (DVD), a digital tape, memory, etc. In some implementations, the signal bearing medium 1001 may encompass a computer recordable medium 1004, such as, but not limited to, memory, read/write (R/W) CDs, R/W DVDs, etc. In some implementations, the signal bearing medium 1001 may encompass a communications medium 1005, such as, but not limited to, a digital and/or an analog communication medium (e.g., a fiber optic cable, a waveguide, a wired communications link, a wireless communication link, etc.). Thus, for example, the signal bearing medium 1001 may be conveyed by a wireless form of the communications medium 1005 (e.g., a wireless communications medium conforming to the IEEE 802.11 standard or other transmission protocol).

The one or more programming instructions 1002 may be, for example, computer executable and/or logic implemented instructions. In some examples, a computing device such as the computing device 900 of FIG. 9 may be configured to provide various operations, functions, or actions in response to the programming instructions 1002 conveyed to the computing device 900 by one or more of the computer-readable medium 1003, the computer recordable medium 1004, and/or the communications medium 1005.

It should be understood that arrangements described herein are for purposes of example only. As such, those skilled in the art will appreciate that other arrangements and other elements (e.g. machines, interfaces, functions, orders, and groupings of functions, etc.) can be used instead, and some elements may be omitted altogether according to the desired results. Further, many of the elements that are described are functional entities that may be implemented as discrete or distributed components or in conjunction with other components, in any suitable combination and location.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims, along with the full scope of equivalents to which such claims are entitled. It is also to be understood that the terminology used herein is for the purpose of describing particular embodiments only, and is not intended to be limiting.

What is claimed is:

1. A computer-implemented method, comprising:
receiving training data comprising a respective training data set for each of two or more languages;
processing a monolingual deep neural network (DNN) acoustic model on a given training data set of the two or more languages;
initializing one or more weights of a multilingual DNN acoustic model based on the processing of the monolingual DNN acoustic model, wherein the multilingual DNN acoustic model comprises a feedforward neural network having multiple layers of one or more nodes, wherein each node of a given layer connects with a respective weight to each node of a subsequent layer, and wherein the multiple layers of one or more nodes comprise one or more hidden layers of nodes that are shared between at least two of the two or more languages and a language-specific output layer of nodes corresponding to each of the two or more languages;
after initializing the one or more weights of the multilingual DNN acoustic model based on the processing of the monolingual DNN acoustic model, processing, by one or more computing devices, the multilingual DNN acoustic model based on the training data to generate a trained multilingual DNN acoustic model; and using the trained multilingual DNN acoustic model in an automatic speech recognition (ASR) system.

2. The computer-implemented method of claim 1, wherein processing the multilingual DNN acoustic model comprises jointly training the multilingual DNN acoustic model using backward propagation of errors.

3. The computer-implemented method of claim 1, further comprising processing the multilingual DNN acoustic model in a distributed framework comprising multiple computing devices.

4. The computer-implemented method of claim 3, further comprising processing multiple model instances of the multilingual DNN acoustic model in parallel on subsets of training data, wherein weights determined for a respective model instance of the multiple model instances are shared through a centralized parameter server during the processing.

5. The computer-implemented method of claim 1, further comprising:
receiving a pretrained deep belief network; and
initializing one or more weights of the multilingual DNN acoustic model based on the pretrained deep belief network.

6. The computer-implemented method of claim 1, wherein the respective training data set for each of the two or more languages comprises one or more of supervised-read speech, unsupervised-read speech, supervised-spontaneous speech, and unsupervised-spontaneous speech.

7. The computer-implemented method of claim 1, wherein the ASR system is configured for execution in a mobile device.

8. The computer-implemented method of claim 1, wherein the ASR system comprises one or more of a monolingual ASR system and a multilingual ASR system.

9. The computer-implemented method of claim 1, wherein using the trained multilingual DNN acoustic model in the ASR system comprises outputting probabilities associated with phonetic states of a hidden Markov model based on an acoustic input.

10. The computer-implemented method of claim 9, wherein a number of nodes of each language-specific output layer is dependent on a number of phonetic states for a corresponding language of the two or more languages.

11. The computer-implemented method of claim 1, wherein the trained multilingual DNN acoustic model is configured to be used to perform ASR in multiple languages of the two or more languages.

12. The computer-implemented method of claim 1, wherein the one or more hidden layers of nodes comprise multiple hidden layers of nodes, and wherein the multiple hidden layers of nodes are organized in a tree-like structure in which a first group of nodes of the multiple hidden layers are shared between a first group of at least two languages and a second group of nodes of the multiple hidden layers are shared between a second group of at least two languages, the first group of at least two or more languages being different than the second group of at least two languages.

13. A non-transitory computer-readable medium having stored therein instructions, that when executed by a computing device, cause the computing device to perform functions comprising:
receiving training data comprising a respective training data set for each of two or more languages;
processing a monolingual deep neural network (DNN) acoustic model on a given training data set of the two or more languages;
initializing one or more weights of a multilingual DNN acoustic model based on the processing of the monolingual DNN acoustic model, wherein the multilingual DNN acoustic model comprises a feedforward neural network having multiple layers of one or more nodes, wherein each node of a given layer connects with a respective weight to each node of a subsequent layer, and wherein the multiple layers of one or more nodes comprise one or more hidden layers of nodes that are shared between at least two of the two or more languages and a language-specific output layer of nodes corresponding to each of the two or more languages;
after initializing the one or more weights of the multilingual DNN acoustic model based on the processing of the monolingual DNN acoustic model, processing the multilingual DNN acoustic model based on the training data to generate a trained multilingual DNN acoustic model; and
using the trained multilingual DNN acoustic model in an automatic speech recognition (ASR) system.

14. The non-transitory computer-readable medium of claim 13, wherein the respective training data set for each of the two or more languages comprises one or more of supervised-read speech, unsupervised-read speech, supervised-spontaneous speech, and unsupervised-spontaneous speech.

15. The non-transitory computer-readable medium of claim 13, wherein using the trained multilingual DNN acoustic model in the ASR system comprises outputting probabilities associated with phonetic states of a hidden Markov model based on an acoustic input.

16. A computing device, comprising:
a processor; and
a computer-readable medium, configured to store instructions, that when executed by the processor, cause the computing device to perform functions comprising:
receiving training data comprising a respective training data set for each of two or more languages;
processing a monolingual deep neural network (DNN) acoustic model on a given training data set of the two or more languages;
initializing one or more weights of a multilingual DNN acoustic model based on the processing of the monolingual DNN acoustic model, wherein the multilingual DNN acoustic model comprises a feedforward neural network having multiple layers of one or more nodes, wherein each node of a given layer connects with a respective weight to each node of a subsequent layer, and wherein the multiple layers of one or more nodes comprise one or more hidden layers of nodes that are shared between at least two of the two or more languages and a language-specific output layer of nodes corresponding to each of the two or more languages;
after initializing the one or more weights of the multilingual DNN acoustic model based on the processing of the monolingual DNN acoustic model, processing, by one or more computing devices, the multilingual DNN acoustic model based on the training data to generate a trained multilingual DNN acoustic model; and using the trained multilingual DNN acoustic model in an automatic speech recognition (ASR) system.

\* \* \* \* \*